UNITED STATES PATENT OFFICE.

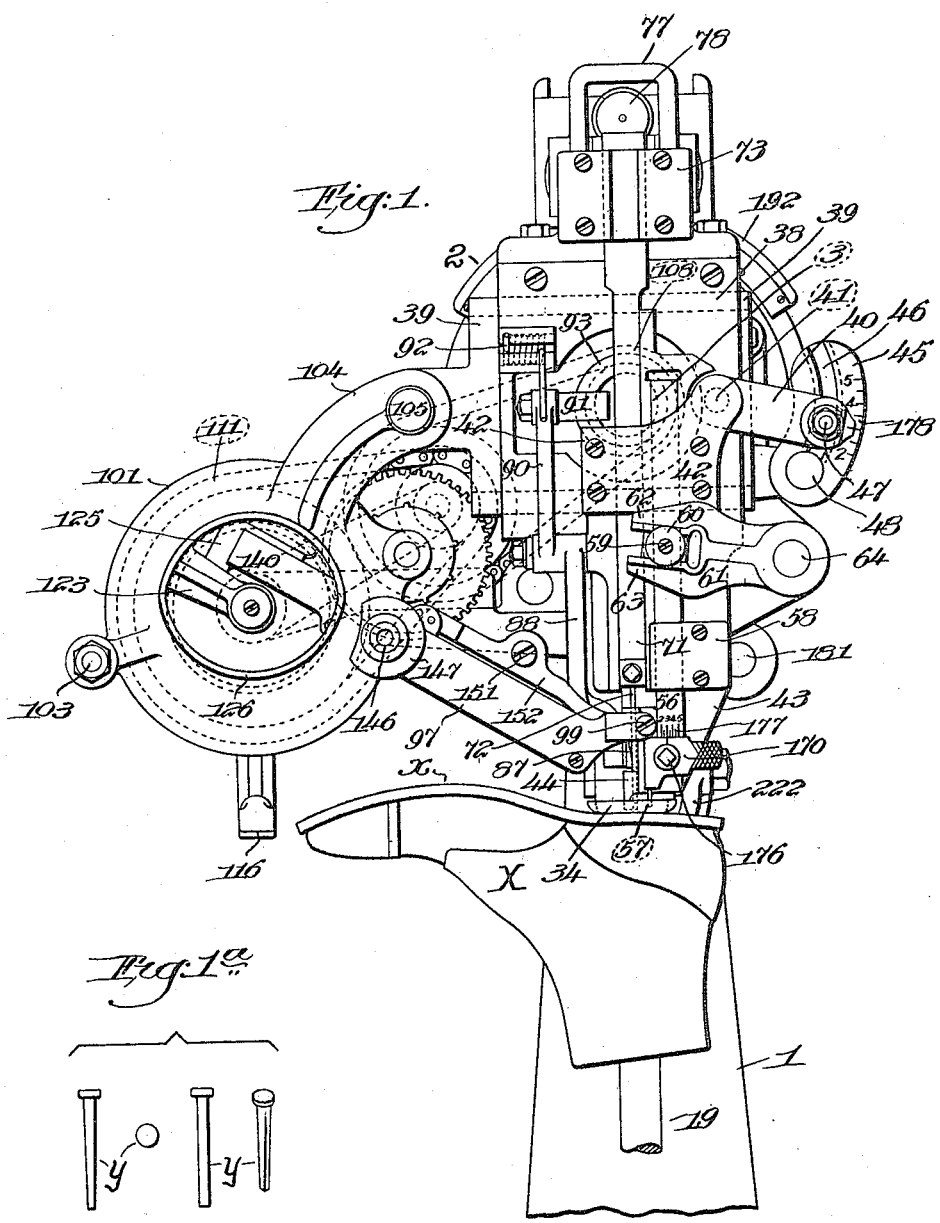

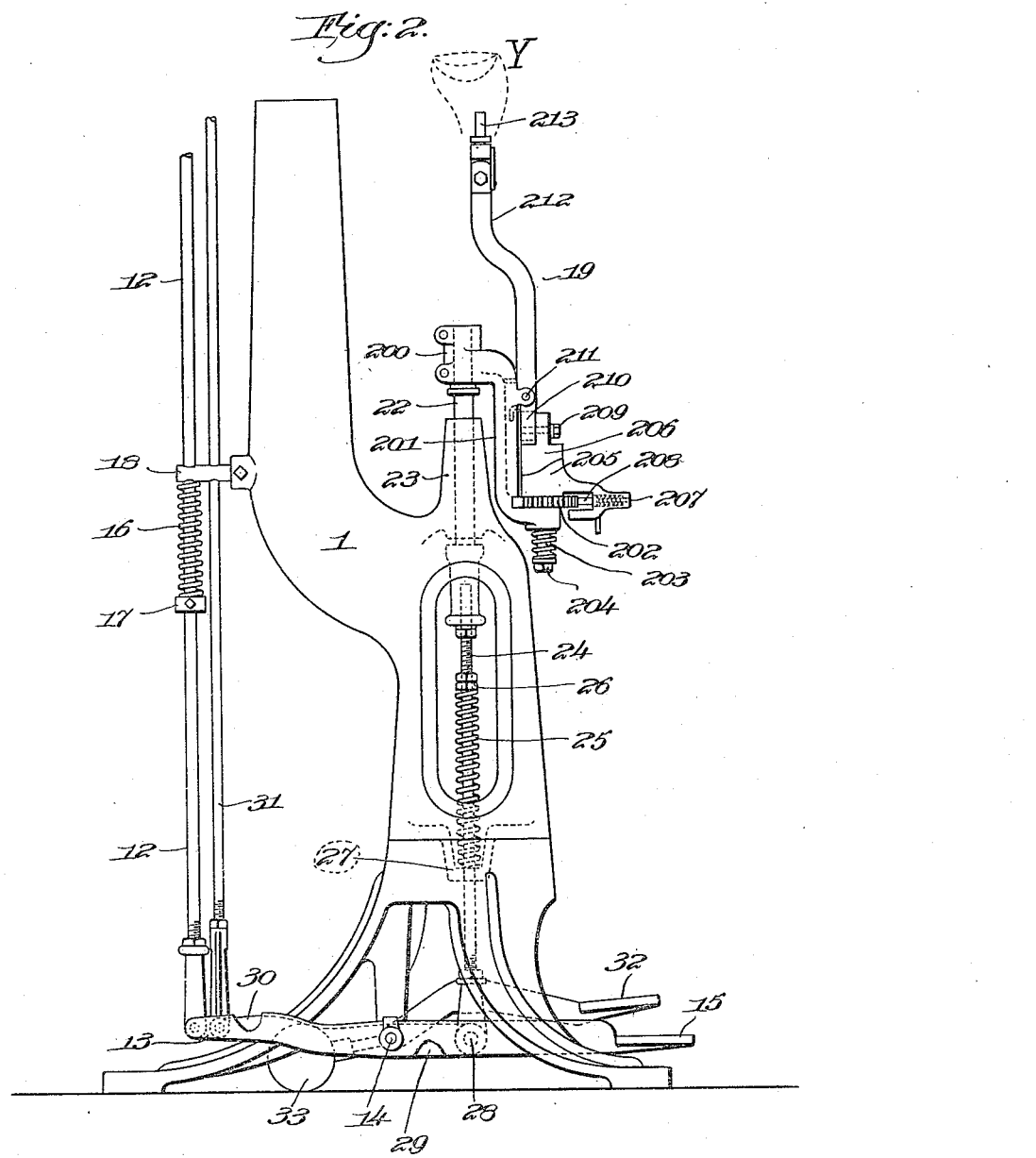

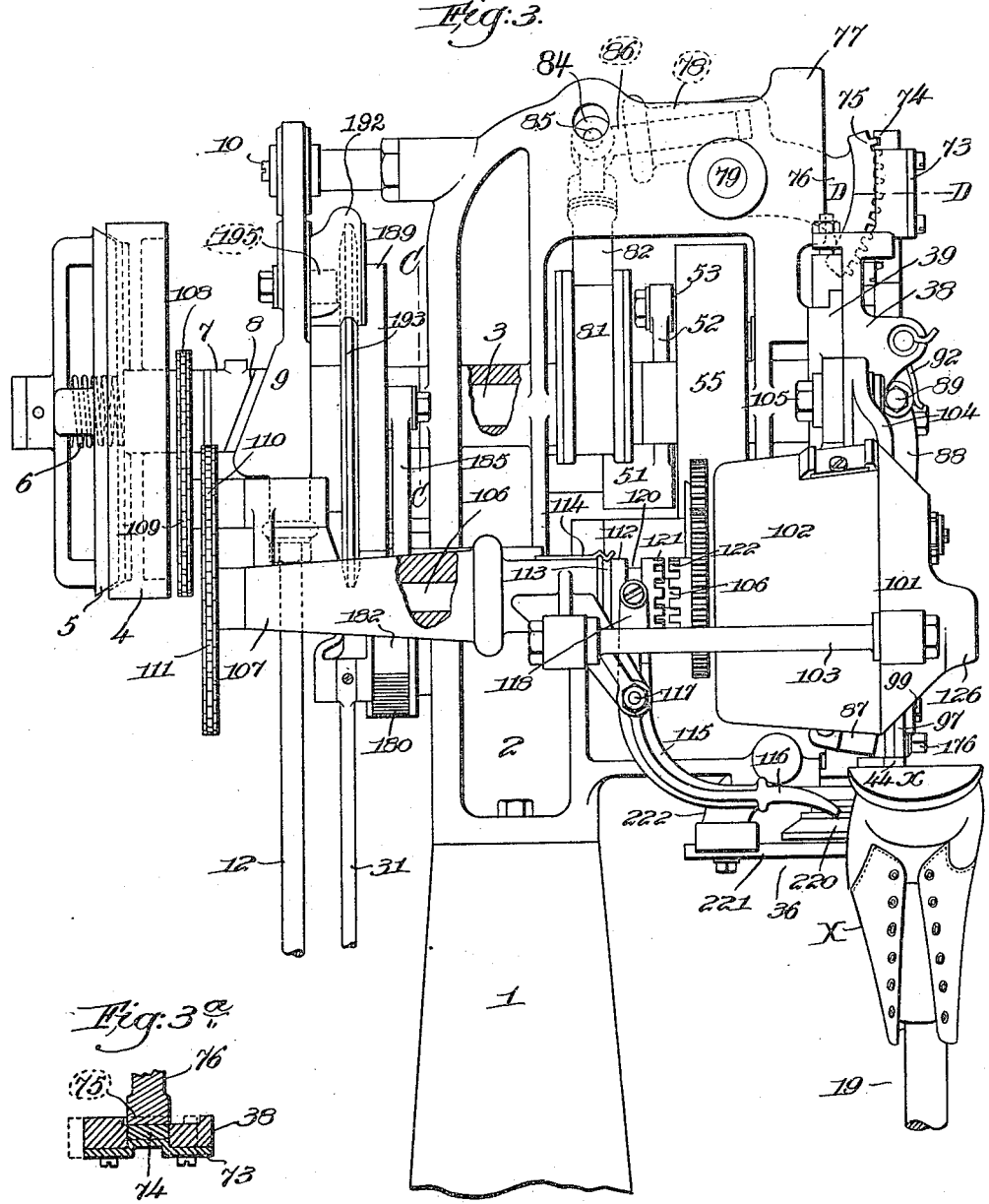

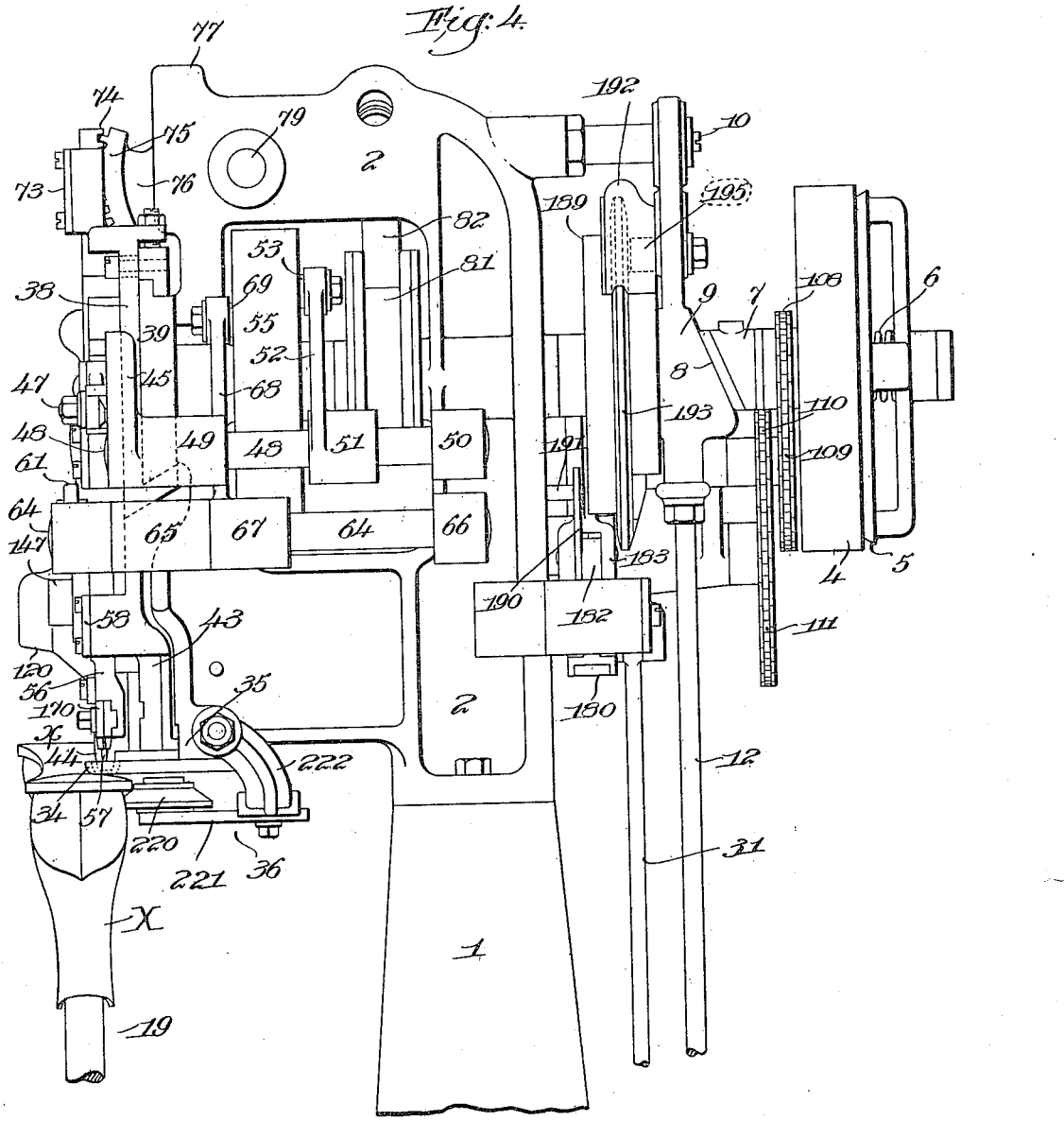

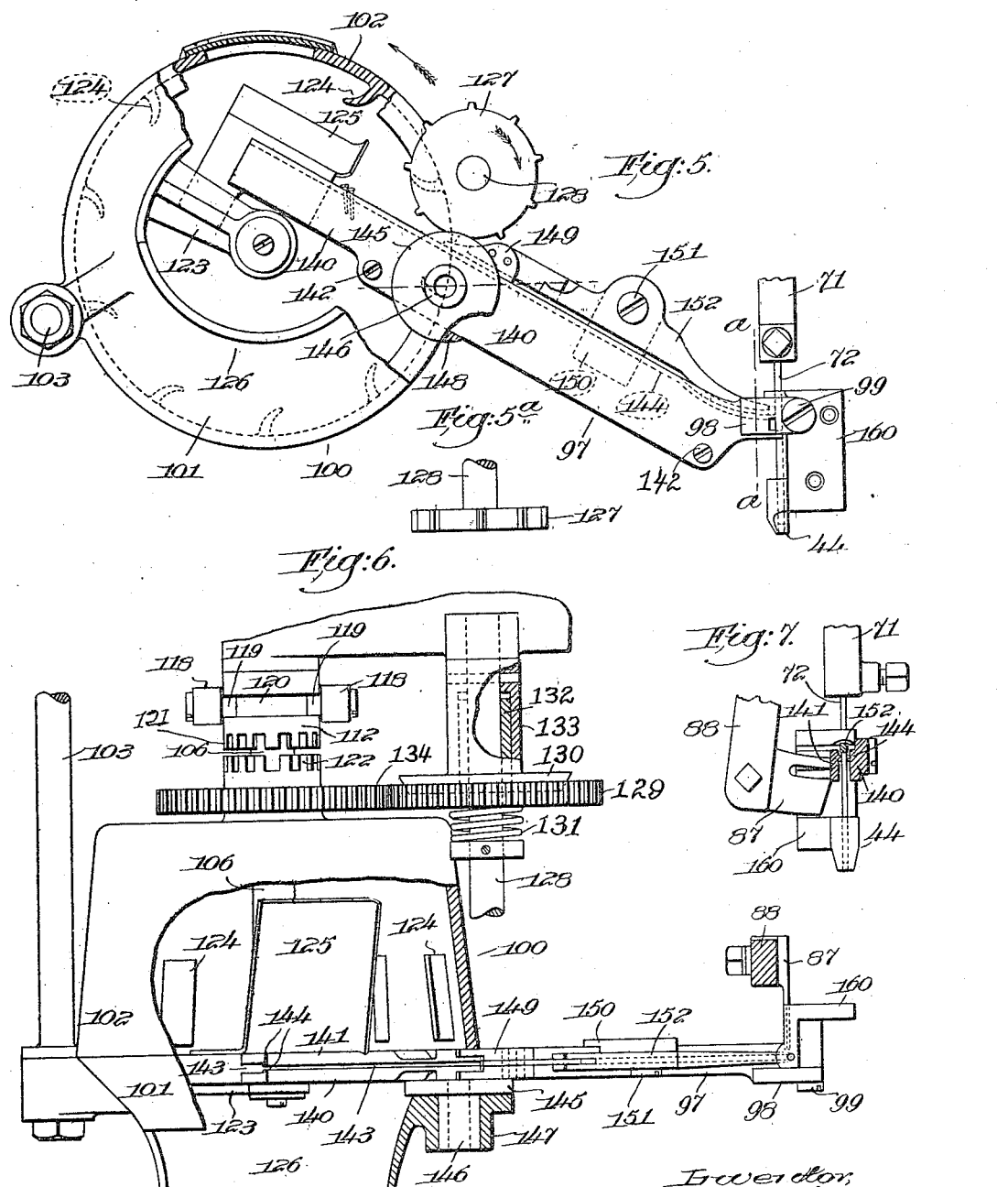

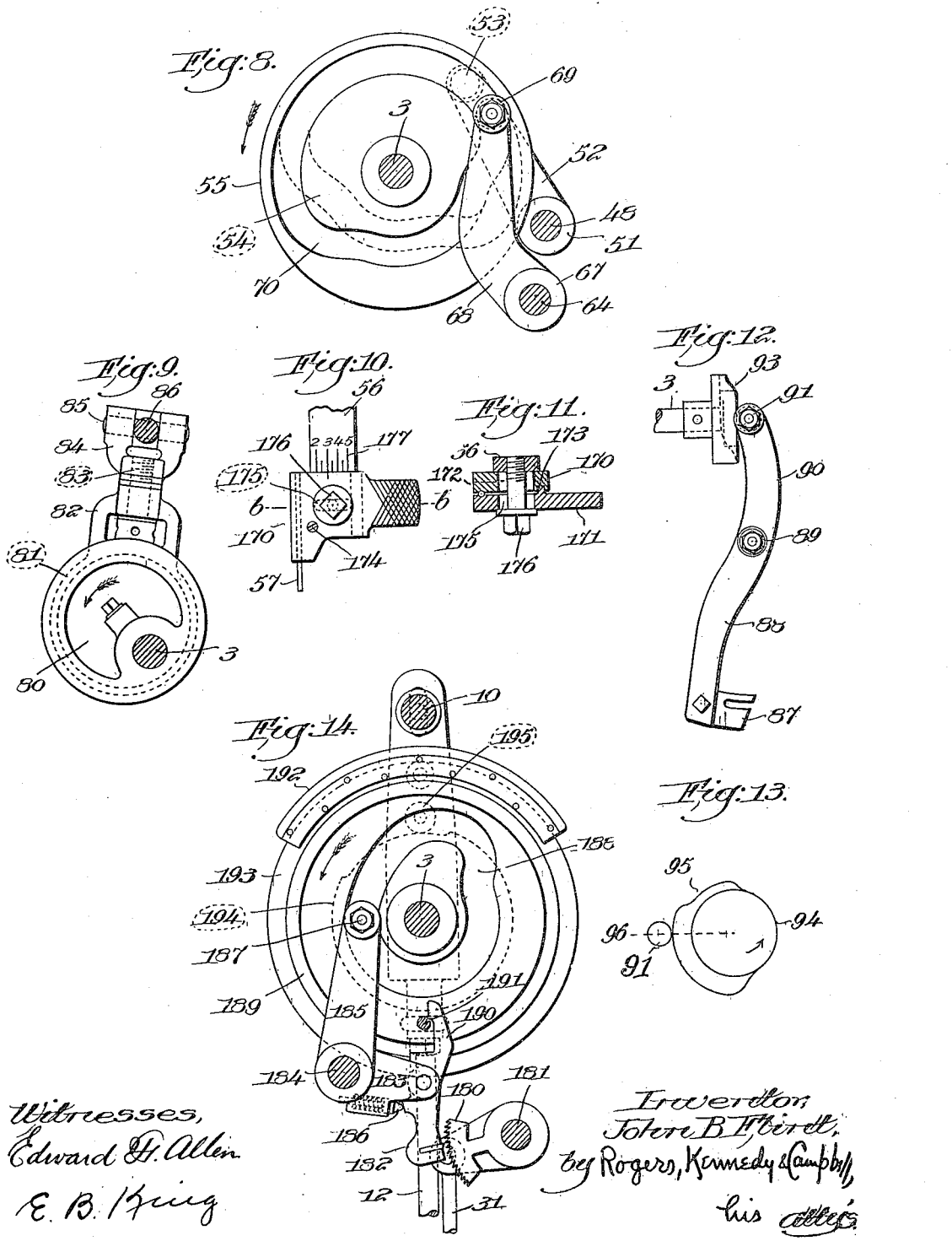

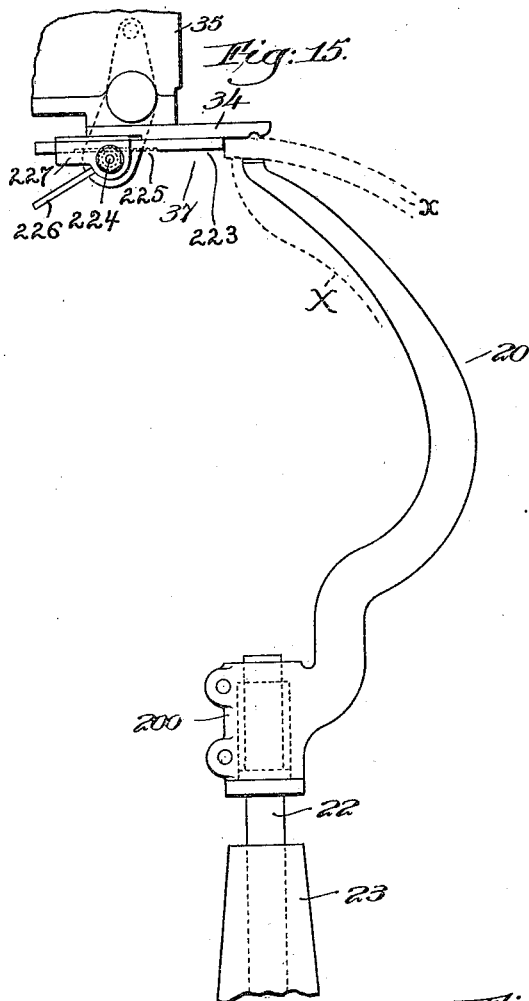
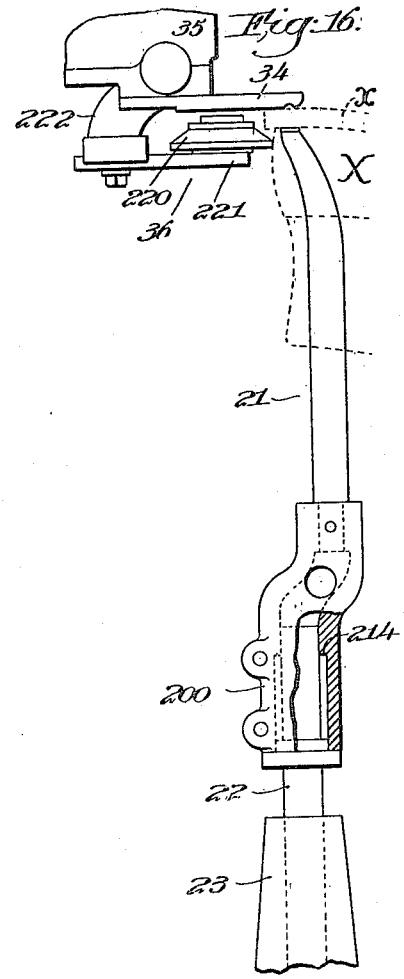
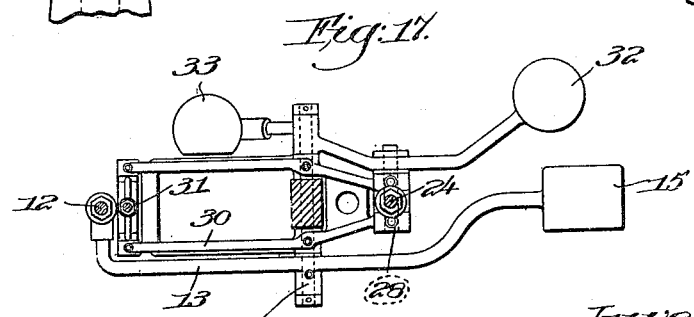

JOHN B. FLINT, OF WINTHROP, MASSACHUSETTS, ASSIGNOR TO THE REECE SHOE MACHINERY COMPANY, OF BOSTON, MASSACHUSETTS, A CORPORATION OF MAINE.

NAILING-MACHINE.

1,225,794.  Specification of Letters Patent.  Patented May 15, 1917.

Application filed July 6, 1912. Serial No. 708,041.

*To all whom it may concern:*

Be it known that I, JOHN B. FLINT, a citizen of the United States, residing at Winthrop, in the county of Suffolk and State of Massachusetts, have invented certain new and useful Improvements in Nailing-Machines, of which the following is a specification, reference being had therein to the accompanying drawing.

My invention relates to nailing machines, and more particularly to what may be termed loose nailing machines, handling loose nails, tacks, pegs or like fastenings supplied in bulk by a reservoir, this type of machine being employed for example in the manufacture of boots and shoes, as for instance when made on the McKay system for nailing soles to the uppers, or on the Goodyear welt system for seating the heels.

Among the objects of the present invention are the improvement generally and the improvement in certain specific features of machines of this class to the betterment of their construction, operation, efficiency and durability. These objects will be explained more fully in the following specification, as also the novel features of construction, arrangement and combination for accomplishing such objects.

I will first describe one form or embodiment of my invention, and will thereafter point out the novel features in the claims.

In the accompanying drawings forming a part hereof, Figure 1 is a front elevation of the upper portion of a nailing machine embodying my improvements.

Fig. 1ª illustrates nails adapted to be used in such machine.

Fig. 2 is a left-hand elevation of the lower portion of the machine shown in Fig. 1, while Fig. 3 is a similar left-hand elevation of the upper portion thereof, these two figures taken together constituting a view of the entire machine.

Fig. 3ª is a horizontal section on the plane D—D of Fig. 3.

Fig. 4 is a right-hand elevation of the upper portion of the machine shown in Figs. 1, 2 and 3.

Fig. 5 is an enlarged front elevation of the nail reservoir, chute and driving parts.

Fig. 5ª is a top view of the clearing wheel 127.

Fig. 6 is a top view of the parts shown in Fig. 5, except the clearing wheel 127.

Fig. 7 is a left-hand elevation of the nail picker, the driver and the throat, partly in section taken on the plane *a—a* of Fig. 5.

Fig. 8 is a front elevation of the main cam and the pins and arms operated thereby for actuating the slide-head and the awl respectively.

Fig. 9 is a front elevation of the eccentric on the main shaft for actuating the driver.

Fig. 10 is a front view of the awl, awl holder and bar.

Fig. 11 is a central cross-section taken on the horizontal plane *b—b* of Fig. 10.

Fig. 12 shows in left elevation the picker, its lever and its operating cam.

Fig. 13 is a diagram showing the contour and timing of the picker cam.

Fig. 14 is a front elevation taken partly in section on the vertical plane *c—c* of Fig. 3, and showing the work support depressing cam and the machine brake.

Fig. 15 shows a different form of work support from that of Fig. 2, and a special adjustable work guide coöperable therewith.

Fig. 16 shows a plain horn which may be employed as a work support.

Fig. 17 is a top view, partly in section, of the treadles and working parts at the base of the machine.

Similar numerals of reference designate corresponding parts in the several figures of the drawings.

In describing the construction of the machine illustrated in the drawings above referred to, I will for convenience first refer to the general parts and the principal operating instrumentalities of the machine so as to give a complete conception of the machine's functions and the inter-relations of its parts, and will then in detail set forth the construction of the respective parts, their relative location and arrangement and the intermediary trains of mechanisms for causing them to go through their necessary operations.

The frame of the machine may be described as having a lower portion 1 including the base, and an upper portion 2 carrying the main shaft and the greater part of the active members of the machine. Understanding that the bottom *x* of the shoe X constitutes the work, this during operation is located between a fixed presser foot 34 above it and a depressible work support 19 or 20 or 21 beneath it, the latter taking several forms as in Figs. 2, 15 and 16 respectively. To the rear of the work is a guide 36 or 37 for the same, as the nailing progresses around the margin of the work, this guide taking different forms, as for example in Figs. 4 and 15 respectively. In the middle part of the frame upper portions is located the forwardly and rearwardly extending horizontal main shaft 3 driven by power and serving to effect all the operations of the machine save those that are preferred to be accomplished by hand, as hereinafter set forth. Controlling levers or treadles are shown at the base of the machine in Fig. 2, one of these treadles 15 when depressed serving to throw the main shaft into operation until when the treadle is lifted the shaft is brought to a stop at a particular point of its revolution. The treadle 32 when depressed serves to pull down the work support against yielding resistance so as to permit work to be inserted, and the work support is also depressible through a cam on the main shaft, so that during each revolution the work may be released from pressure against the presser foot sufficiently to enable the step-by-step feeding of the work. In the forward upper part of the machine above the work and presser foot is the reciprocating head 38 connected to be moved to right and left for the purpose of alternately feeding the work and restoring the parts to driving position. The head 38 carries the awl 57 which reciprocates upwardly and downwardly and is engaged in the work during the feeding, the picker 87 which separates off the foremost nail and serves to press it into the driving channel, the reciprocating driver 72 which forcibly drives each successive nail into the hole previously formed by the awl, and the throat 44 forming the bottom of the nail channel and contacting the work as the nail is forced through the throat into the work. A nail chute 97 leads to the picker and nail channel from a reservoir 100 into which loose nails may be thrown in bulk to be fed into and through the chute to the work.

The cams and other intermediate mechanism and details hereinafter to be described are so constructed, arranged and adapted as to effect the following preferred order of operation of the parts hereinabove referred to.

The main shaft is always automatically stopped at a given point of its revolution, and in all the figures the parts are shown in position corresponding thereto, namely the work support is yieldingly held upward toward or against the presser foot, the head 38 stands in its right-hand position, which is driving position, the driver has started to rise after delivering a nail into the work, the awl is in its elevated position out of the work, and the picker is in its rearward position removed from the nail chute and channel.

The driving shaft, it will be understood, revolves with great rapidity in operation, (between six and seven revolutions per second). Taking, however, one single revolution, the following preferred order of operations will take place.

Initially the driver continues to rise farther, the awl moves downwardly, the work support becomes engaged by the automatic mechanism for depressing it, and the feed movement of the head 38 commences. About this time the picker moves partly forward to commence the separation of the foremost nail and it then momentarily stops.

As the driver continues and completes its upward movement the picker completes its forward stroke forcing the foremost nail into the downward channel, and the feeding movement of the head 38 is completed.

Thereupon the awl rises out of the work and the work support is permitted to rise to clamp the work against the presser foot. Whereupon the head 38 moves backward to its right-hand or driving position.

Finally the picker moves backward out of the channel while the driver descends to drive the nail into the hole formed by the awl, and immediately the driver rises through a quarter turn of its operating eccentric to the original position described at the commencement of the cycle; and thereupon if the operator's foot has been lifted from treadle 15, the machine comes to a stop with the parts in such position.

Referring now more in detail to the machine hereof, the frame lower portion 1 and the frame upper portion 2 need not be described further or in detail, although various permanent portions or projections of the same may be hereinafter referred to by a separate reference numeral in connection with the description of the various operating portions of the machine.

The driving shaft 3 is located substantially centrally with respect to the two sides of the machine, and is mounted in an ordinary way in fixed bearings provided in the frame, so as to be rotatable but incapable of longitudinal movement. The shaft 3 is adapted to be connected to, and disconnected from a source of power by a clutch 4, 5, the portion 4 of which constitutes a pulley for a belt or the like, constantly driven by power, and loose upon the shaft 3 or upon an interposed sleeve so that normally the pulley's rotation does not effect that of the shaft. The clutch part 5 constitutes a friction piece preferably conical, adapted to enter and engage a corresponding recess in the pulley whenever the latter is longitudinally moved in a direction to close the clutch. A spring 6 may be suitably fitted to cause the pulley 4 to yieldingly stand away from the clutch part 5, and for causing the reverse movement of the pulley for the engagement of the clutch and the operation of the machine, the following connections may be employed. A sleeve 7 slidable longitudinally with relation to the shaft but fitted against revolution therewith is formed with an inclined contact portion 8 at its forward surface, having engagement with an up-and-down sliding wedge or piece 9 fitted at 10 above to be vertically guided, as it is caused to move through rod 12 extending downwardly to the rear end of controlling lever 13, which is intermediately pivoted at 14, and whose forward end 15 constitutes the treadle for throwing the machine into and out of operation. Manifestly by depressing the treadle 15 the wedge 9 is lifted and the sleeve 7 and clutch part 4 are forced rearwardly to cause frictional engagement between the clutch parts 4 and 5 so that the former, driven by a belt, will cause the latter and the driving shaft 3 to rotate. A helical spring 16 confined between a collar 17 on the rod 12 and a fixed projection 18 from the frame, serves to normally maintain the rod and the wedge piece 9 in lower position, and the treadle 15 elevated.

Interchangeable work supports 19, 20 or 21 may be applied to the machine by fitting them as desired on the upper end of spindle 22, which latter is fitted to slide vertically in upward projection 23 of the lower frame part 1. An extension 24 of the spindle 22 is surrounded by a helical spring 25, which is confined by adjustable nuts 26 upon the spindle extension, and by a lower projection or bearing 27 in such way that the tendency of the spring is to force the spindle and work support constantly upward by a pressure which is adjustable through the nuts 26. The spindle extension 24 is continued to where at its lower end it has a pivotal connection 28 with the forward end of the lever 29 which swings about the same axle 14 as the lever 13 before mentioned, the rear end 30 of lever 29 being connected to an upwardly extending rod 31 which may be automatically raised at every revolution in the manner to be hereinbelow described, for the purpose of swinging the lever 29, and thereby depressing the spindle 22 and the work support. A third lever 32 also pivoted to swing about axle 14 and formed at its front end to constitute a treadle, is arranged to overlie a portion of the lever 29 before referred to, so that by depression of said treadle the operator at will is enabled to depress the work support for the removal and insertion of work. So as to keep the treadle 32 normally elevated and out of the way of the reciprocating lever 29, a counterweight 33 may be affixed to an extension at the rear end of lever 32 as shown.

The details of the work supports 19, 20 and 21 will be postponed to a later point, it being sufficient here to state that they shall be so constructed that the work carried thereon may be advanced beneath the presser foot to permit every part of the work in turn to come beneath the driver and awl.

The presser foot 34 is preferably a fixed part of the machine taking part neither in the up-and-down movements of the work nor the back and forth movements of the feed mechanism. Referring to Fig. 4, the lower front part of the machine frame is shown formed with a strengthening rib or flange, a portion of which 35 may for convenience be employed for the permanent attachment of the presser foot 34 as shown.

Beneath the presser foot 34 and to the rear of the nailing point is provided the form of work guide 36 shown in Figs. 3 and 4, or the alternate form of work guide 37 shown in Fig. 15, the purpose of these guides being to gage the distance at which the line of nails will be located from the margin of the shoe, the guide contacting preferably with the last as shown, so that the location of the nails will be with respect to the upper rather than the sole edge. The details of the construction of the guides 36 and 37 will be postponed to a later point in this specification.

The reciprocating head 38 carrying four of the operative instruments of the machine and connected to the nail chute, is of some complication, and it will now be described in construction and operation by reference to Figs. 1, 3 and 4.

The head 38 is shown herein not as oscillating about an axle, but as moving to and fro upon fixed guide 39, and this as shown being horizontal, the movement of the head is a horizontal reciprocation.

The head is driven to and fro through connections including a link 40 whose left end, Fig. 1, is pivotally connected to the head by means of a pin 41 shown in dotted lines extending between the body of the head and a fixed plate 42 located slightly in front of, and secured so as to form part of, the head.

The lower portion or extension 43 of the head extends substantially to the nailing point, and indeed at the lower part of said extension and fixed relatively thereupon is the throat 44 forming the lower terminus of the nailing channel and guiding the nail into proper place in the work. As indicated the presser foot 34 is centrally hollowed out, and between its two sides the throat 44 is located, the presser foot having sufficient horizontal length to permit the throat and other parts to reciprocate to and fro therein.

The horizontal reciprocation of the head 38 may be effected by the following mechanism. The right-hand end of link 40, Fig. 1, is adjustably connected to a curved crank arm 45 having an arc shaped slot at 46 under-cut as indicated for the reception of the head of the pin or bolt 47 by which the link 40 is pivoted to the arm 45. The shaft 48 which carries the crank arm 45 extends forwardly and rearwardly, being mounted in bearings indicated at 49 and 50 Fig. 4. Fixed on the horizontal shaft 48 is a hub 51, from which extends arm 52, which at its upper end has a cam stud or roller 53 engaging in a cam or groove 54 in the rear face of the disk or casting 55. The contour of the cam 54 is indicated in dotted lines in Fig. 8 which is a front view. Manifestly the eccentric portions of the cam 54 cause the swinging of the arm 52 and thereby the oscillation of the shaft 48 and the to-and-fro movement of the head 38. It is not deemed necessary to describe in detail the contour of cam 54, since its contour will be understood from the previously set forth description of the machine's operation and timing. The cam 54 makes one complete rotation in each cycle of the machine's movement, and as will be perceived said cam and the disk 55 in which it is formed are mounted upon, to rotate with, the main shaft 3 of the machine.

The head 38 slidingly carries the awl bar 56, at whose lower end is adjustably held the awl 57, the details of the connection to be later described. The awl bar is capable of sliding upwardly and downwardly in the head which affords a close-fitting efficient slideway, the awl bar being removable by taking off the confining plates 42, before mentioned, and 58. The means for moving the awl upwardly and downwardly will now be described.

At a convenient point in its height the awl bar 56 has a forwardly extending pin 59 with an overhanging disk 60. Engaging the pin 59 and confined by the disk 60 is the slotted end of an operating arm 61 whose two terminal portions 62 and 63 straddle the pin 59 with a close fit to prevent lost motion. The slot between the parts 62, 63 is of sufficient length to permit the awl bar to move horizontally as carried by the head 38. At its right end the arm 61 is connected fast to a forwardly and rearwardly extending shaft 64 which as seen in Fig. 4 is mounted in bearings 65 and 66 in the machine frame. A hub 67 fast on the shaft 64 has an upwardly extending arm 68 which at its upper end is provided with a cam stud or roller 69 extending rearwardly into a cam or groove 70 formed in the front face of the disk or casting 55, mounted as before stated to rotate with the main shaft 3. Manifestly the eccentric portions of cam 70 will cause the swinging of arms 68 and 61, and the up and down movements of the awl bar.

The driver bar 71 carrying the nail driver 72 at its lower end is vertically arranged in substantially central position with respect to the sides of the head 38, the awl bar before described being to the right of the driver bar, Fig. 1, and the picker 87 to be afterward described, being to the left thereof. The driver bar 71 is fitted to slide vertically in the head by means of a groove cut in the latter, and is there held in place in a manner similar to the awl bar, namely by the overlying plate 42 before mentioned, and a second plate 73 attached at the extreme upper end of, and practically forming an upward extension of, the head 38. The driver bar at its upper end has means for causing its vertical movements, and this will now be described in detail.

The upper end of the driver bar 71 is exposed at its rear and is there provided with horizontally extending teeth constituting a straight vertical rack 74 adapted to be engaged by the corresponding teeth of a curved rack or partial gear 75 mounted at the forward end of a stout arm 76 which is adapted to be swung upwardly and downwardly within the overhanging frame part 77. The arm 76 and an integral arm 78 to the rear of it together constitute a sort of walking beam pivoted at 79 upon a fixed pin or shaft, the arm 78 extending rearwardly therefrom and having connection to the main shaft 3. This connection includes a sort of universal joint intermediate the arm 78, and an eccentric on the main shaft. The eccentric 80, Fig. 9, is engaged by an eccentric strap 81 cast on the lower end of a swivel member 82, to which is swiveled the pin 83 downwardly extending from a yoke 84, in which latter is mounted a cross pin 85 upon which swings the rear end of a rod 86, which as indicated in Fig. 3 is capable of sliding lengthwise or forwardly and rearwardly within the arm 78. The several pivotal connections described constitute a perfect mechanical connection from the eccentric to the walking beam 76, 78, and they operate in such way that the rotation of the eccentric causes the oscillation in a vertical plane of the walking beam, whereby the curved rack 75 at the front causes by its co-action with the rack 74, the up and down movements of the driver bar 71.

It will be observed that the teeth of one of the racks 74 or 75, namely the latter, are of sufficient horizontal length to maintain engagement between the racks notwithstanding a substantial horizontal movement of the driver bar as it is carried to and fro by the head 38. Thus an efficient operative connection is maintained, whereby the horizontal movements of the head and bar are freely permitted, while the bar may be at any and all times vertically reciprocated through the power connections described.

The dotted lines, Fig. 3ª, indicate the head 38 and rack 74 in left-hand position.

The picker 87 is at the lower end of the lower curved arm 88 of a lever centrally pivoted at 89 to the head 38, and having its upwardly extending arm 90 provided with a cam stud or roller 91 and provided also with means in the form of a helical spring 92 whose terminus presses rearwardly on the arm 90, thereby tending to hold the picker forward. I will now describe the means for actuating the picker lever and picker.

As before explained the movement of the picker is a forward and rearward movement with certain interruptions or pauses. The cam stud 91 is arranged at the same level as the center of the driving shaft 3, and on the extreme forward end of said driving shaft is mounted a picker operating cam 93, as seen in Figs. 1 and 12. This cam is in the nature of a disk, the margin of which on its forward side has irregular elevations and depressions so as to cause the cam stud 91 to move forwardly and permit it to move rearwardly in accordance with the cam's contour. The contour of the cam 93, it will be understood, is such as to cause the picker to operate in harmony with the other parts, for example, in the order of timing previously set forth herein. For example, the contour of the cam 93 may be as indicated in the diagram Fig. 13, where the circle 94 forms a base, and the irregular line 95 indicates by its varying radial separation from the circle 94, the relative height of the different portions of the cam's circumference. The radius 96 represents the position of the cam pin 91 when the machine is brought to rest.

For feeding the successive nails to the nail channel under control of the picker and for the purpose of being driven by the driver into the hole formed in the work by the awl, a nail chute 97 is shown, its lower end 98 being connected by a pivot 99 to a part of the reciprocating head 38 adjacent the nail channel. At its upper end the chute coöperates with a nail reservoir 100. It will be understood that the chute 97 is movable with respect to the reservoir since the chute, being at its lower end pivoted to the reciprocating head, must have some longitudinal sliding with respect to the reservoir.

The details and coöperation of the head, the throat, the driver, the picker and the chute will be hereinbelow described, after setting forth the details and mode of operation of the reservoir and chute.

The reservoir 100 consists of a shell comprising a front or stationary shell portion 101 and a rear or rotating shell portion 102 having sliding contact with portion 101. The stationary shell portion 101 is held firmly in place by means of two fixed supporting members, namely, the long stay bolt 103 at the left provided with proper collars and nuts, and the extension 104 above, which extension is bolted at 105 to the frame.

The rotating shell portion 102 is fitted to be clutched or unclutched at the forward end of a rearwardly extending shaft 106, which passes through a long stationary casting or fixed lug 107, and the shaft 106 is actuated from the main shaft 3 for convenience by the following gearing. A sprocket wheel 108 fast on clutch member 4, but loose on the main shaft, drives, through a sprocket chain, a sprocket wheel 109 upon an intermediate shaft, which latter shaft also has a smaller sprocket wheel 110 that drives, through a sprocket chain, a larger sprocket wheel 111 secured on the shaft 106. By this arrangement the shaft 106 is rotated whenever the loose clutch member or pulley 4 is rotated. Near the forward end of shaft 106 is a toothed and grooved clutch member 112. This clutch member 112 is keyed to the shaft 106 so as to rotate with it, and so as to be capable of forward and rearward movement relatively to the shaft. At the rear end of member 112 is a slight groove 113 engaged by a yielding spring 114 to latch the clutch in open position when opened. The hand lever 115 with a handle 116 at its forward end is pivoted at 117, and beyond the pivot it extends upwardly and is forked or yoked at 118 to straddle the member 112, the yoke parts having pins 119, 119 engaging in the groove 120 of the member 112 so that by throwing the handle 116 the clutch member 112 may be forced forwardly or rearwardly.

At its front end the clutch member 112 has teeth 121 adapted to engage with corresponding teeth 122 at the rear end of an annular boss formed at the back of the rotating shell portion 102. This boss is centrally bored and receives the forward end of shaft 106 as a convenient means of supporting the boss and the rear end of the rotating shell. The shaft 106 indeed is shown extending forwardly through the reservoir to a point within the stationary portion 101 thereof, where a front bearing for the shaft is afforded by the radial piece 123 extending inward from the stationary shell portion 101, this arrangement serving also to steady the stationary shell portion.

Understanding that the main driving shaft 3 is in constant rotation when the machine is in operation, it will be seen that the shaft 106 is likewise in constant rotation, and if the operator by forcing downwardly the handle 116 should throw the clutch part 112 forward into engagement with the complementary clutch part comprising teeth 122, the rotating shell portion 102 will rotate with the shaft, this rotation being in a left-handed direction looking at the parts from the front as in Fig. 1.

The rotating shell portion on its interior is provided with a number of ribs or vanes 124, each of which as it rises serves to lift a bunch of nails to the upper part of the reservoir where the nails are discharged upon the spill plate 125 located immediately above and slightly to the rear of the upper portion of the chute 97. This spill plate 125 is inclined not only laterally to conform to the chute's inclination, but is inclined forwardly so as to spill the nails over its front edge upon the top edge of the chute, whereby those nails that by chance properly strike the chute will drop partly thereinto so as to stand vertically with their heads running along above the chute's vertical slot.

The front or stationary reservoir portion 101 is centrally apertured in front presenting an opening of substantial size, giving a clear view of the interior and permitting the hand to be inserted, also permitting a supply of nails to be easily fed into the reservoir and the latter thus kept properly full without undue trouble or care. As seen in Fig. 3 the shell portion surrounding the lower half of the front opening is extended considerably forward at 126 to guard against the accidental ejection of nails. The rotating shell portion 102 is provided with a peripheral port-hole as shown, which may be revolved to the bottom so that the reservoir at will may be emptied by opening the door.

In order to prevent clogging and binding of the nails at the upper side of the chute where it passes out of the reservoir, a clearing wheel 127 is employed having circumferential teeth for clearing loose nails away from the danger point and throwing them back into the reservoir. This wheel or drum 127 is mounted at the forward end of a short rearwardly extending shaft 128 and extends partly within the reservoir through an opening formed in the stationary shell portion 101 for that purpose. The shaft 128 carrying the clearing wheel has forward and rearward fixed bearings and near its rear end has a clutch member.

Pinned to the shaft 128, and normally in driving engagement with a gear 129 otherwise lose on the shaft, is a conical clutch member 130, a spring 131 tending to hold gear 129 thereto. The gear is carried on loose sleeve 132, the member 130 upon fast sleeve 133. The gear 129 is constantly engaged by gear 134 carried on and rotating with reservoir portion 102. The reservoir being in rotation the gear 129 will be in constant rotation. Normally the shaft 128 and clearing wheel will rotate. But clogging of the clearing wheel or other severe resistance will cause slippage between shaft and gear so that rotation of clearing wheel will be stopped and breakage prevented.

The chute 97 is an elongated substantially straight member and pivotally connected both to the head 38 and the reservoir 100. The chute is built up of a front half or piece 140 and a complementary piece 141 at the back, the two secured rigidly together by screws 142 and so shaped as to present between them a slot or kerf 143, the upper portion of which is rendered sufficiently narrow by means of ledges 144, as to hold the head of the nail, whereby the nails may ride vertically as they pass by gravity down the chute to the nailing position.

The pivotal connection between the chute and reservoir includes a circular piece 145 made preferably of bearing metal having a cylindrical forward extension 146 engaged in a fixed bearing 147 cast in one piece with the fixed reservoir portion 101. Projecting rearwardly from the lower part of disk 145 is a segment 148, Fig. 5, upon which the bottom of the chute rests and slides in its to-and-fro movements. At the upper portion of disk 145 is secured to its rear side a piece 149 which bears upon the top surface of the chute, which is thus held in proper position during its movements. The relative oscillation between the disk 145 and its fixed bearing permits the necessary change of angle of the chute caused by the to-and-fro horizontal movements of its lower end.

The rear chute piece 141 is provided with an upward projection 150, at the forward portion of which is attached by screw 151 a chute top piece 152, this being an elongated member extending lengthwise of the top of the chute and spaced slightly above the top of the chute so as to leave room for the nail heads to pass downwardly and at the same time to cover over the chute and protect it and the nail heads as the latter slide downwardly to driving position. It will be noted from the dotted lines in Fig. 5 that the ribs or ledges 144 while generally straight, depart slightly from straightness toward the lower end, curving downwardly so that the ribs stand somewhat below the top side of the chute; and the top piece 152 is correspondingly shaped at this point so that the head of each nail is engaged below by the two ribs and protected above by the top piece until actually arriving at the driving point. Fig. 7 taken on the plane a—a of Fig. 5 shows the relation of the chute parts 140, 141, 144 and 152, while Fig. 5 shows that the ribs 144 and the top piece 152 terminate to the left of the line of the driver 72.

That part of the head 38 at which the successive nails pass from the chute to the driving channel, preferably consists of a removable piece 160, secured rigidly to the head, having the throat 44 rigidly secured to it, and having the chute 97 pivotally secured to it by the screw 99. This piece 160 will be generally open at its left side for the operation of the picker, and will have proper vertical grooves or recesses for the guidance of the nail from the terminus of the chute to the throat, and suitably shaped for the forward and rearward reciprocation of the picker. The picker, it will have been understood, constitutes during the driving of the nail a left-hand wall to the nail channel. The driver 72, as it descends for driving the nail, enters first through an opening in the top of piece 160; then passes between the space bounded at front and back by the chute pieces 140, 141, at the right by piece 160 and at the left by the picker upper portion; then through the vertical passage formed in the left-hand wall of piece 160 closed at its left side by the picker lower portion; and finally through the throat 44. As shown the picker is slotted forming an upper and lower portion. As it comes forward it picks off the foremost nail by passing between it and the succeeding nail, acting first near the head end of the nail, and as the driver rises after a stroke, then acting upon both ends of the nail forcing the nail completely from the ribs or ledges 144 of the chute into the nail channel beneath the driver.

The connection between the awl bar and awl is seen in Figs. 1 and 4, and in enlarged views in Figs. 10 and 11. It is manifest that if we wish to change the spacing between the nails it is necessary not only to alter the throw of the head 38, but also to correspondingly adjust the position of the awl relatively to the driver. I have afforded an easy and accurate mode of making the corresponding adjustments. The awl 57 is carried not directly upon the awl bar 56, but upon an awl block 170 comprising front and back pieces 171, 172, held in alinement at one side by rib 173 on one piece engaging a groove in the other piece, and held in alinement on the other side by the awl 57 itself, there being a securing screw 174 for locking the two pieces and the awl together. These combined pieces are adjustable upon the lower end of the awl bar 56, being shaped to slide horizontally in a recess formed for that purpose in the awl bar, as clearly seen in Fig. 4, the awl block being horizontally slotted at 175 and having a securing screw 176 passing through such slot into the rear of the awl bar. The right-hand end of the awl block is extended to form a handle so that upon loosening the screw 176 the block and awl are easily moved to right or left with respect to the bar.

It has already been explained that the throw of the head 38 is regulable by the adjustable connection 47 between link 40 and slotted crank arm 45. In the present invention I have calibrated both the adjustment of the link 40 for the throw of the head, and the awl block 170 for the position of the awl, and the calibrations are made to accurately correspond in the two cases. Thus assuming the desired range of nail spacing is from ⅖ to ⅗ of an inch, a scale running from 2 to 5 is employed for each adjustment. In the case of the awl a scale 177 is shown applied at the foot of the awl bar, and this coöperates with a score mark or index on the awl block, which index may be set at any part of the scale according to the desired spacing of the nails. For example, it may be set at 3, indicating ⅗ of an inch spacing. At the same time a corresponding adjustment would be made of the link 40, there being a scale 178 on the crank 45 coöperating with an index on the link shown set at 3. In this adjustment the awl is ⅗ of an inch from the driver and the throw of the head is ⅗ of an inch so that after each punching operation of the awl succeeded by a feed movement of the head the puncture in the work will be brought directly beneath the driving position of the driver.

The various work supports operate generally upon the same principle, they serving to hold the work up against the blows of the awl and the driver, and at the same time permitting the work to be advanced along the gage as the nailing progresses. In each case, moreover, the arrangement is such that the nail on being driven into the work meets a hard metal surface beneath the work which serves to clench the nail. In the present embodiment of my invention no means is necessary to lock the work support in upward position, since the upward spring pressure and the weight of the parts affords sufficient opposition to the blow of the driver. As already explained, however, the work support has to be automatically depressed at a certain point in each cycle, that is in each revolution of the main shaft. The following is a convenient mechanism for effecting this operation. Referring to Figs. 2, 3, 4 and 14, the connecting bar 31 already referred to is so connected that upon lifting it the work support is depressed. At its upper end the rod 31 is connected to an oscillating toothed rack 180 in such way that the two together may swing about a fixed axle 181. This rack is adapted to be engaged at proper times by a movable pawl 182, which when lifted serves to lift the rack and the rod 31, and depress the work support. The pawl 182 is hung at the inward end of the arm 183 of a bell crank lever, mounted to oscillate about a fixed axle 184, and having a second arm 185 extending to where it may be cam operated. A spring operated plunger 186 constantly presses on the pawl 182 tending to force it in engagement with the rack 180. At the upper end of arm 185 is a pin or roller 187 shown engaged in the concentric portion of a cam or groove 188 formed in the front face of a disk 189 mounted upon, so as to rotate with, the main shaft 3. The cam 188 has eccentric portions as shown, whereby the arm 185 may be thrown to the left for lifting the pawl and rack. The cam 188 thereby serves not only to depress the work support, but also to lock it in depressed position as long as necessary, and this cam serves also the third purpose of releasing the pawl from the toothed rack when the work support has been returned to working position. This is accomplished by a heel or extension 190 constituting a part of the pawl and projecting above the pivotal connection between the pawl and the bell crank lever. Whenever the parts are restored to the normal position shown in Fig. 14, the inner curved part of the heel 190 contacts with fixed pin 191 which throws the heel to the right, thereby throwing the pawl to the left and disengaging it from the rack so that the operator is free to depress and release the work support at will.

For braking and stopping the machine, a recessed brake shoe 192 is shown coöperating with the beveled outer edge 193 of the disk 189. The shoe 192 is connected at the front side of upwardly and downwardly moving slide 9 previously mentioned, so that when the slide 9 descends to release the clutch 4, 5 as before explained, it simultaneously throws the brake shoe 192 into engagement with its complementary member 193, thereby stopping the machine. It has been before stated that the machine when automatically stopped is brought always to the same normal position, and this is effected herein by a cam surface 194 formed on the same disk 189 and coöperating with pin or roller 195 projecting from the forward side of slide 9. The cam 194 has a concentric elevated portion and a comparatively short depressed portion so arranged that the roller 195 is sustained by the former and allowed to drop only when the latter comes beneath it.

If now the rod 12 be held elevated by the treadle 15 the slide 9 is held elevated, the brake 192 is held disengaged, and the clutch 4, 5 is held engaged so that the machine runs continuously. If on the contrary the rod 12 is dropped this effects the disengagement of the clutch 4, 5 as stated, and would permit the dropping of the slide 9 and the application of the brake 192 but this is prevented until the main shaft has completed its revolution, when the roller 195 will drop into the depressed portion of cam 194, thereby permitting slide 9 to drop and the brake to be applied to stop the machine in the desired position.

I will now refer to the form of work support and edge gage illustrated in Figs. 1, 2, 3 and 4, and will subsequently refer to other types of support and gage shown in other figures. The work support 19 shown in Fig. 2 is of a type which may be termed a jack, it being adapted to be engaged on top of or removed from the depressible spindle 22. The portion 200 of the jack constitutes a socket for receiving the spindle and from this forwardly extends a drop extension 201 which at its forward lower end is formed with a notched horizontal base plate 202, through which vertically passes a rod 203 having a nut or head at its lower end confining a spring 204 between the base plate and the head, so as to forcibly pull down upon the rod. Loosely surrounding the rod above the base 202 is a rotatably adjustable member 205 having a helical contacting surface with a complementary member 206 above it, the latter being secured to the rod 203. A handle 207 in front may be swung to right or left for adjusting the position of member 205, so as to raise or lower the member 206, and a spring catch 208 is shown for locking the handle 207 in its desired adjustment. By this means the relative height of the work support may be regulated. Above member 206 is a horizontal pivot pin 209 extending forwardly and rearwardly and serving to pivotally connect member 206 with an intermediate member 210, which in turn has a horizontal pivot pin 211 placed at right angles to pin 209, and serving to pivotally connect member 210 with the upwardly extending shank 212, which at its upper end is provided with a pin 213 adapted to engage in a corresponding aperture in the top of a metal bottomed shoe last Y, so that when the last is applied to a shoe and inverted it may be fitted over the pin 213 as indicated in Figs. 1, 2 and 4. By this arrangement the shoe is in practically floating condition and is free to be moved by the operator, forwardly, backwardly, leftwise or rightwise, while at the same time it is adequately supported and held up by the yielding pressure of spring 25 in contact with the presser foot, excepting of course at such times as the work support may be drawn downwardly away from the presser foot. The work supports 20 of Fig. 15 and 21 of Fig. 16 are simple horns adapted to directly oppose the nail and driver.

As a means of facilitating the removal of the work supports 20—21, I have constructed the socket 200 with its central hole somewhat larger than the spindle 22 and with interior shoulder 214 at the upper end of the socket so that a slight lifting of the work support enables a substantial tipping of the same, whereby further lifting without obstruction is permitted.

The edge gage or guide 36 of Figs. 1, 3, 4 and 16, comprises a freely rotatable wheel 220 made of cork, fiber or the like, it being located between the presser foot 34 above and a supporting plate 221 beneath, the latter extending rearwardly to where by an extension or casting 222 it is rigidly connected to the frame of the machine.

The edge gage 37 of Fig. 15 is adjustable and has no roller. The horizontal gage plate 223, located directly beneath the presser foot, is formed with teeth at 225 engaged by a pinion on tight fitting shaft or pin 224 from which projects handle 226 for shifting it; the whole being carried in a casting 227 secured by its upward extension 228 to the face of fixed frame portion 35.

It being obvious that indefinite variations of detail can be made within the scope of my present improvements, I wish not to be limited to features or detail except as set forth in the appended claims.

What I claim and desire to secure by Letters Patent is:

1. In a nailing machine of the kind specified, a longitudinally movable awl bar, an awl block laterally movable on said bar, and an awl fixed in said block, said block being composed of two separable parts and having means for clamping them together with the awl between them, and for adjustably securing the block to said bar, and means for insuring correspondence of the said separable block parts in their adjustments.

2. In a nailing machine of the kind specified, the combination with nail driving means of a reservoir for loose nails, a chute for conducting a series of nails from the reservoir to the driving means, means for causing nails in said reservoir to pass into the chute, said chute being fitted to reciprocate and oscillate, and a rocking bearing piece on the reservoir having a sliding connection with the chute.

3. In a nailing machine of the kind specified the combination with a reservoir, a chute movable with relation to said reservoir, and a clearing wheel part of which extends into the reservoir near the chute for clearing obstructing nails therefrom, said wheel mounted on an auxiliary power driven shaft, and a safety device in connection with said shaft for permitting slippage or disengagement of the clearing wheel when the clearing wheel is stopped from rotation by clogging or the like.

4. In a nailing machine of the kind specified the combination of a to and fro moving head, an up and down moving driver carried thereby, a driving shaft, a walking beam lever, a connection at one end of said lever to said driver, and a connection from said shaft to the other end of said lever, said last named connection comprising an eccentric on the shaft and a universal joint between said eccentric and said lever.

5. In a nailing machine of the kind specified, the combination of a main shaft, a horizontally reciprocating head, an awl bar movable vertically in the head, a pair of parallel horizontal shafts each having an arm or crank, means connecting one such arm or crank to said head, means connecting the other arm or crank to said bar, and a cam on said main shaft for actuating both said parallel shafts, said first connecting means comprising a link and said second connecting means comprising a stud or roller on said bar engaged directly by the arm or crank.

In testimony whereof I affix my signature in presence of two witnesses.

JOHN B. FLINT.

Witnesses:
THOMAS J. CARTY,
FREDERICK W. DAVISON.

Copies of this patent may be obtained for five cents each, by addressing the "Commissioner of Patents, Washington, D. C."